(12) United States Patent
Hoshino

(10) Patent No.: US 10,297,136 B2
(45) Date of Patent: May 21, 2019

(54) HEAD-MOUNTING DISPLAY, NOTIFICATION APPARATUS, NOTIFICATION SYSTEM, NOTIFICATION METHOD, AND PROGRAM

(71) Applicant: Sony Interactive Entertainment Inc., Tokyo (JP)

(72) Inventor: Masanori Hoshino, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/570,870

(22) PCT Filed: Jun. 20, 2016

(86) PCT No.: PCT/JP2016/068296
§ 371 (c)(1),
(2) Date: Oct. 31, 2017

(87) PCT Pub. No.: WO2016/208546
PCT Pub. Date: Dec. 29, 2016

(65) Prior Publication Data
US 2018/0165942 A1    Jun. 14, 2018

(30) Foreign Application Priority Data
Jun. 26, 2015    (JP) .................................. 2015-129135

(51) Int. Cl.
*G08B 21/00* (2006.01)
*G02B 27/02* (2006.01)
(Continued)

(52) U.S. Cl.
CPC ........... *G08B 21/22* (2013.01); *G02B 27/017* (2013.01); *G02B 27/02* (2013.01);
(Continued)

(58) Field of Classification Search
CPC ................. G08B 21/22; G08B 21/00
(Continued)

(56) References Cited

U.S. PATENT DOCUMENTS

| 6,290,357 B1 * | 9/2001 | Massengill | ............ A61B 3/024 |
| | | | 351/209 |
| 6,445,363 B1 | 9/2002 | Urisaka | |

(Continued)

FOREIGN PATENT DOCUMENTS

| JP | 2000235163 A | 8/2000 |
| JP | 2004205711 A | 7/2004 |

(Continued)

OTHER PUBLICATIONS

International Preliminary Report on Patentability and Written Opinion for corresponding PCT Application No. PCT/JP2016/068296, 5 pages, dated Jan. 4, 2018.

(Continued)

*Primary Examiner* — Qutbuddin Ghulamali
(74) *Attorney, Agent, or Firm* — Matthew B. Dernier, Esq.

(57) ABSTRACT

There is provided a head-mounted display, a notification apparatus, a notification system, a notification method, and a program that allow a person not wearing a head-mounted display to know that a user still continues to wear a head-mounted display after a notification that a wearing time of the head-mounted display of this user has exceeded a predetermined time. A wearing time determination block determines a wearing time of the head-mounted display of the user. A notification block executes a first notification to the user if the wearing time has exceeded a first time and, when the wearing time has exceeded a second time longer than the first time, and executes a second notification to a person not wearing the head-mounted display.

6 Claims, 7 Drawing Sheets

(51) Int. Cl.
*G08B 21/22* (2006.01)
*H04N 5/64* (2006.01)
*G02B 27/01* (2006.01)
*G06F 3/0481* (2013.01)

(52) U.S. Cl.
CPC ........... *G06F 3/04815* (2013.01); *H04N 5/64* (2013.01); *G02B 2027/014* (2013.01); *G02B 2027/0141* (2013.01)

(58) Field of Classification Search
USPC ....................................................... 340/573.1
See application file for complete search history.

(56) References Cited

U.S. PATENT DOCUMENTS

| | | | | |
|---|---|---|---|---|
| 8,957,948 B2* | 2/2015 | Ernst | ................... | G02B 27/017 345/8 |
| 9,581,612 B2* | 2/2017 | Albinali | .................. | G01P 13/00 |
| 2005/0052376 A1* | 3/2005 | Shivji | ................... | B82Y 10/00 345/82 |
| 2012/0050493 A1* | 3/2012 | Ernst | ................... | G02B 27/017 348/47 |
| 2014/0292637 A1 | 10/2014 | Peng | | |
| 2014/0362110 A1 | 12/2014 | Stafford | | |

FOREIGN PATENT DOCUMENTS

| | | |
|---|---|---|
| JP | 2008257671 A | 10/2008 |
| JP | 2012002889 A | 1/2012 |
| JP | 2013210588 A | 10/2013 |
| WO | 2012133021 A1 | 10/2012 |

OTHER PUBLICATIONS

International Search Report for corresponding PCT Application No. PCT/JP2016/068296, 2 pages, dated Aug. 2, 2016.
Supplementary European Search Report for corresponding EP Application EP16814316, 7 pages, dated Jan. 31, 2019.

* cited by examiner

WEARING TIME t

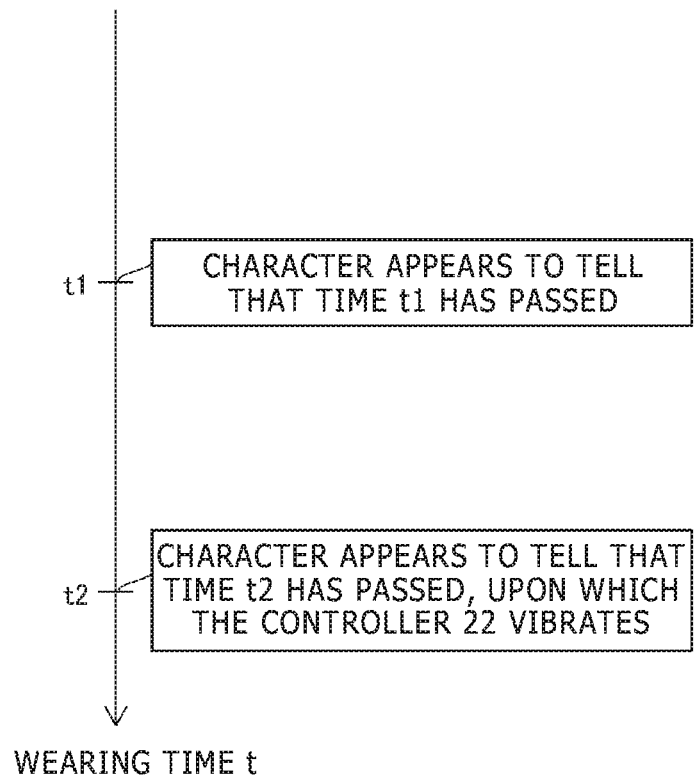

FIG.6 t1

| MAIN EXECUTION ENTITY | DESTINATION OF NOTIFICATION | CONTENT OF PROCESSING |
|---|---|---|
| HMD 12 | USER | IN THE HMD 12, SOUND "ONE HOUR HAS PASSED" IS MIXED AND OUTPUTTED | t2

| MAIN EXECUTION ENTITY | DESTINATION OF NOTIFICATION | CONTENT OF PROCESSING |
|---|---|---|
| RELAY APPARATUS 16 | USER | SUB SCREEN IS SUPERPOSED AND LONG ALARM SOUND IS MIXED AND OUTPUTTED |
| RELAY APPARATUS 16 | VIEWER OF THE DISPLAY 18 | DISPLAY BY THE SUB SCREEN INDICATING EXPIRATION STARTS | t3

| MAIN EXECUTION ENTITY | DESTINATION OF NOTIFICATION | CONTENT OF PROCESSING |
|---|---|---|
| ENTERTAINMENT APPARATUS 14 | USER AND VIEWER OF THE DISPLAY 18 | MOTION OF CHARACTER SLOWS DOWN | t4

| MAIN EXECUTION ENTITY | DESTINATION OF NOTIFICATION | CONTENT OF PROCESSING |
|---|---|---|
| RELAY APPARATUS 16 | USER | VIDEO IMAGE AND SOUND ARE MUTED |
| RELAY APPARATUS 16 | VIEWER OF THE DISPLAY 18 | MUTING OF VIDEO IMAGE AND SOUND IS ADDITIONALLY DISPLAYED |

WEARING TIME t

HEAD-MOUNTING DISPLAY, NOTIFICATION APPARATUS, NOTIFICATION SYSTEM, NOTIFICATION METHOD, AND PROGRAM

TECHNICAL FIELD

The present invention relates to a head-mounted display, a notification apparatus, a notification system, a notification method, and a program.

BACKGROUND ART

A head-mounted display (HMD) for viewing video images by wearing by a user on the head thereof, such as cited in PTL 1 through 3 below, is known, for example. Such an HMD provides the user wearing it video images that are high in the sense of immersion.

CITATION LIST

Patent Literature

[PTL 1] JP 2004-205711 A; [PTL 2] JP 2012-2889 A; [PTL 3] JP 2013-210588 A

SUMMARY

Technical Problem

A user viewing a video image that is high in the sense of immersion tends to forget the passing of time. Therefore, notifying the user of the passing of predetermined duration of time in which an HMD has been worn allows the user to know that he or she has been wearing the HMD for long time.

It should be noted here that, after the notification mentioned above is given, the user still may continue to wear the HMD. If this happens, it is desirable to prompt a parental guardian, for example, so as to instruct a user for the detachment of the HMD. However, with related-art HMDs, a parental guardian, for example, who is not wearing an HMD cannot know that a user still continues to wear an HMD even after the notification is given that wearing time has exceeded predetermined duration of time.

Therefore, the present invention addresses the above-described problem and solves the problem by providing, as one object of the present invention, a head-mounted display, a notification apparatus, a notification system, a notification method, and a program that are configured to allow a person not wearing a head-mounted display to know that a user wearing a head-mounted display still continues to wear the head-mounted display after a notification is given that the wearing time has already passed predetermined duration of time.

Solutions to Problem

In order to solve the problem above and according to the present invention, there is provided a head-mounted display. This head-mounted display includes: a wearing time determination block configured to determine a wearing time of the head-mounted display of a user; and a notification block configured to execute a first notification to the user if the wearing time has exceeded a first time and, when the wearing time has exceeded a second time longer than the first time, execute a second notification to a person not wearing the head-mounted display.

According to one aspect of the present invention, if the wearing time has exceeded the second time, the notification block executes the second notification through a display that is visually imperceptible to the user while the user wears the head-mounted display.

According to one aspect of the present invention, the head-mounted display further includes a user identification block configured to identify a user wearing the head-mounted display wherein the wearing time determination block identifies a wearing time of the head-mounted display of the identified user, and, if the wearing time of the identified user has exceeded the second time, the notification block executes the second notification enabled to identify the user concerned.

In one aspect of the present invention, if the wearing time of the identified user has exceeded the first time, the notification block executes the first notification that is common regardless of a user wearing the head-mounted display.

According to another aspect of the present invention, there is provided a notification apparatus. This notification apparatus includes a wearing time determination block configured to determine a wearing time of a head-mounted display of a user; and a notification block configured to execute a first notification to the user if the wearing time has exceeded a first time and, when the wearing time has exceeded a second time longer than the first time, execute a second notification to a person not wearing the head-mounted display.

According to another aspect of the present invention, there is provided a notification system. This notification system includes a wearing time determination block configured to determine a wearing time of a head-mounted display of a user; and a notification block configured to execute a first notification to the user if the wearing time has exceeded a first time and, when the wearing time has exceeded a second time longer than the first time, execute a second notification to a person not wearing the head-mounted display.

According to another aspect of the present invention, there is provided a notification method. This notification method includes: a determining step of determining a wearing time of a head-mounted display of a user; and an executing step of executing a first notification to the user if the wearing time has exceeded a first time and, when the wearing time has exceeded a second time longer than first time, and executing a second notification to a person not wearing the head-mounted display.

According to another aspect of the present invention, there is provided a program. This program for enabling a computer to execute: a determining procedure of determining wearing time of a head-mounted display of a user; and an executing procedure of executing a first notification to the user if the wearing time has exceeded a first time and, when the wearing time has exceeded a second time longer than the first time, and executing a second notification to a person not wearing the head-mounted display.

BRIEF DESCRIPTION OF DRAWINGS

FIG. 5 is a diagram illustrating still another example of a notification in accordance with a wearing time of a head-mounted display that is executed therein related with one embodiment of the present invention.

FIG. 6 is a diagram illustrating yet another example of a notification in accordance with a wearing time of a head-mounted display that is executed therein related with one embodiment of the present invention.

DESCRIPTION OF EMBODIMENTS

The following describes one embodiment of the present invention with reference to the drawings.

Figure 1:
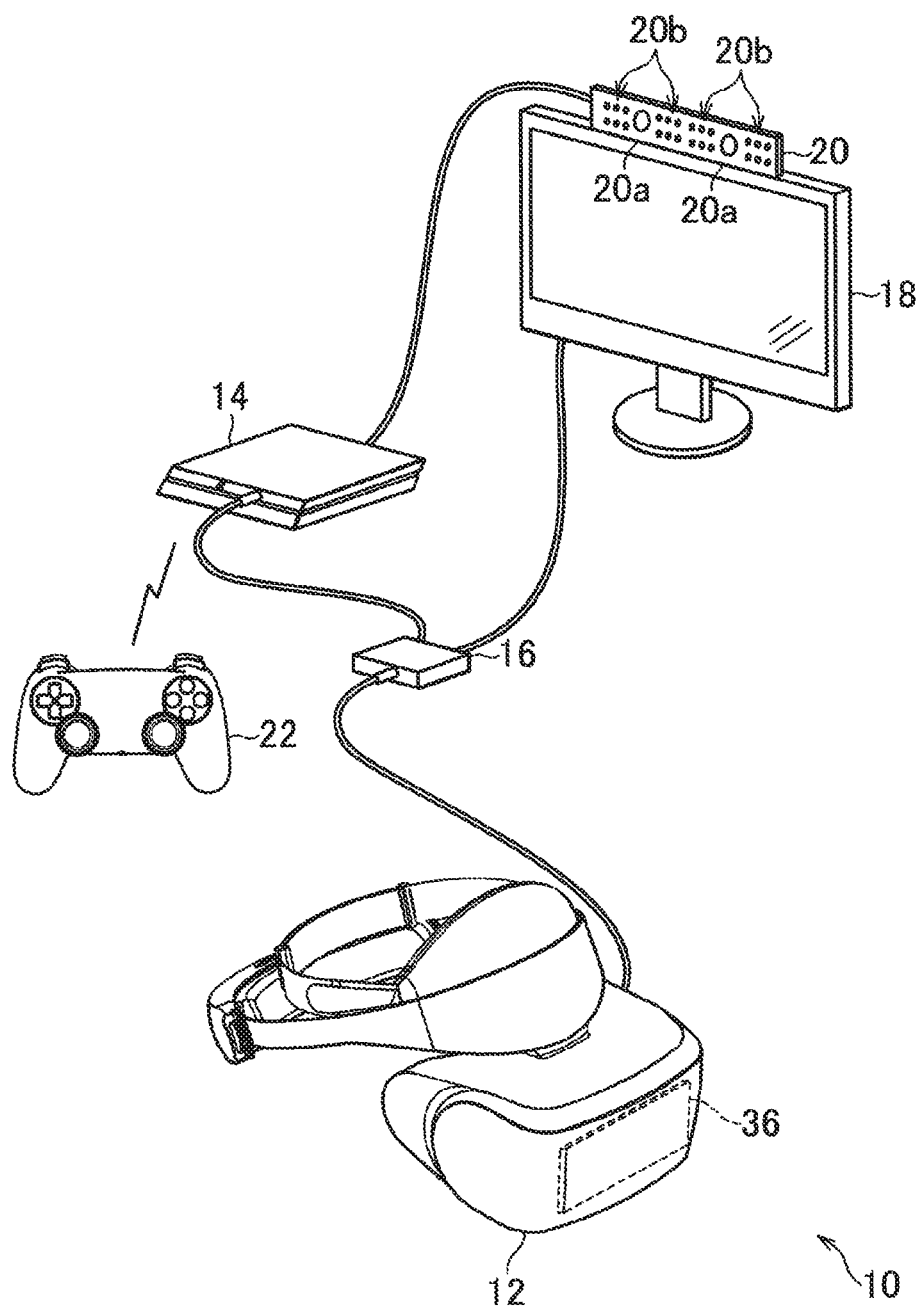
FIG. 1 is diagram illustrating one example of an overall configuration of a video image display system related with one embodiment of the present invention.
Figure 2:
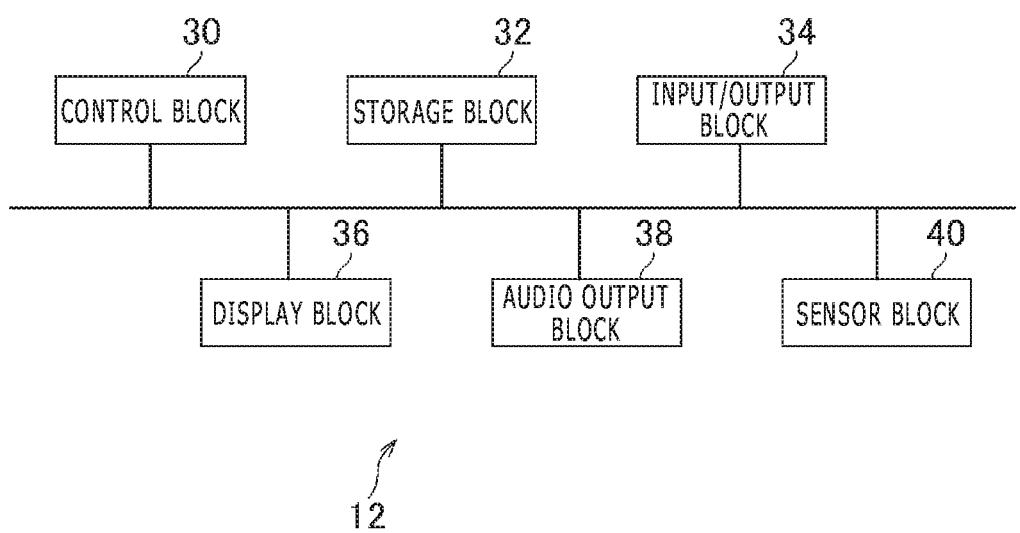
FIG. 2 is a diagram illustrating one example of a configuration of a head-mounted display related with one embodiment of the present invention.

Now, referring to FIG. 1, there is depicted diagram illustrating an overall configuration of a video image display system 10 related with one embodiment of the present invention. FIG. 2 is a diagram illustrating one example of a head-mounted display (HMD) 12 related with one embodiment of the present invention.

As depicted in FIG. 1, the video image display system 10 related with the present embodiment has the HMD 12, an entertainment apparatus 14, a relay apparatus 16, a display 18, a camera and microphone unit 20, and a controller 22.

The HMD 12 related with the present embodiment has a control block 30, a storage block 32, an input/output block 34, a display block 36, an audio output block 38, and a sensor block 40 as depicted in FIG. 2, for example.

The control block 30 is a program control device such as a microprocessor that operates as instructed by a program installed in the HMD 12, for example.

The storage block 32 is a storage device such as a read-only memory (ROM) or a random access memory (RAM). The storage block 32 stores a program and so on that are executed by the control block 30.

The input/output block 34 is an input/output port such as a high-definition multimedia interface (HDMI) port (registered trademark) or a universal serial bus (USB) port.

The display block 36 is a display such as a liquid crystal display or an organic electroluminescence (EL) display that displays a video image and so on that are generated by the entertainment apparatus 14. For example, the display block 36 may be configured to receive a video image signal outputted by the entertainment apparatus 14 and relayed by the relay apparatus 16 and output a video image represented by the received video image signal. The display block 36 related with the present embodiment is configured to display a three-dimensional image by displaying an image for the right eye and an image for the left eye. It should be noted that the display block 36 may be configured only to display a two-dimensional image instead of a three-dimensional image. In addition, the display block 36 may have functions of an on-screen display by which given characters and symbols are displayed on a screen and functions of adding a sub-screen on a display main screen. Further, the display block 36 may have functions of making thinner or monochromatic a video image represented by a received video image signal.

The audio output block 38 is a headphone or a speaker, for example, and outputs sound and so on represented by audio data generated by the entertainment apparatus 14. The audio output block 38 receives an audio signal outputted by the entertainment apparatus 14 and relayed by the relay apparatus 16 and outputs a sound represented by this audio signal.

Further, the audio output block 38 may have a memory in which to store audio data for representing a predetermined sound. In addition, the audio output block 38 may include an audio integrated circuit (IC) that executes audio processing for mixing a sound represented by the audio data stored in this memory with a sound represented by a sound signal received from the relay apparatus 16. Then, the audio output block 38 may output the sound obtained by the mixing executed by the audio IC.

The sensor block 40 is such a sensor that can detect attachment or detachment of the HMD 12 by the user as a proximity sensor like an infrared sensor or a touch sensor in the present embodiment, for example.

It should be noted that the sensor block 40 related with the present embodiment may include such a sensor as an acceleration sensor or a motion sensor. In addition, the sensor block 40 may output measuring results such as the attitude, rotational amount, and movement amount of the HMD 12 to the control block 30 at a predetermined frame rate. Then, on the basis of these measuring results, the control block 30 may identify the movement amount and rotational amount per unit time of the HMD 12, namely, the speed and angular velocity of the HMD 12.

The entertainment apparatus 14 related with the present embodiment is a computer such as a game console, a digital versatile disc (DVD) player, or Blu-ray (registered trademark) player, for example. The entertainment apparatus 14 related with the present embodiment generates a video image and sound by the execution of a stored game program or the reproduction of content recorded on an optical disc, for example. Then, the entertainment apparatus 14 related with the present embodiment outputs a video image signal representative of a generated video image and an audio signal representative of a generated sound to the HMD 12 and the display 18 through the relay apparatus 16.

The relay apparatus 16 related with the present embodiment is a computer including a control block made up of a control circuit, an image processing circuit and an audio processing circuit, and a storage block made up of a memory, for example. In addition, the relay apparatus 16 related with the present embodiment relays a video image signal or an audio signal outputted from the entertainment apparatus 14 and outputs the relayed signals to the HMD 12 and the display 18.

The image processing circuit of the relay apparatus 16 may have on-screen display functions for displaying given characters and symbols on a screen or functions of adding a sub-screen to a displayed main screen, for example. Further, the image processing circuit of the relay apparatus 16 may have functions of manipulating a video image represented by a video image signal transmitted from the entertainment apparatus 14, for example. To be more specific, the image processing circuit of the relay apparatus 16 may have functions of making thinner or monochromatic a video image represented by a video image signal transmitted from the entertainment apparatus 14, for example.

In addition, the audio data representative of a predetermined sound may be stored in the memory of the relay apparatus 16. Then, the audio processing circuit of the relay apparatus 16 may have functions of mixing a sound represented by the audio data stored in this memory with a sound represented by an audio signal received from the entertainment apparatus 14 and outputting the mixed sound to the HMD 12 and the display 18, for example.

The display 18 related with the present embodiment is a liquid crystal display or the like, for example, and displays a video image and so on represented by a video image signal outputted from the entertainment apparatus 14. Then, in the present embodiment, the user wearing the HMD 12 cannot view the display 18 while the user wears the HMD 12. Further, the display 18 may have on-screen display functions of displaying given characters and symbols on a screen or functions of adding a sub-screen to a displayed main screen, for example. Further, the display 18 may have functions of making thinner or monochromatic a video image represented by a received video image signal.

The camera and microphone unit 20 related with the present embodiment includes a camera 20a that outputs an image taken of a subject, for example, to the entertainment apparatus 14 and a microphone 20b that picks up a surrounding sound, converts this sound into audio data, and outputs this audio data to the entertainment apparatus 14. The camera 20a related with the present embodiment is a stereo camera.

The HMD 12 and the relay apparatus 16 are interconnected through an HDMI cable or a USB cable, for example. The entertainment apparatus 14 and the relay apparatus 16 are interconnected through an HDMI cable or a USB cable, for example. The relay apparatus 16 and the display 18 are interconnected through an HDMI cable, for example. The entertainment apparatus 14 and the camera and microphone unit 20 are interconnected through an auxiliary (AUX) cable, for example.

The controller 22 related with the present embodiment is a manipulation input apparatus configured for a user to execute manipulation input on the entertainment apparatus 14. The user presses direction keys and buttons of the controller 22 and tilts a manipulation stick so as to execute various kinds of manipulation inputs through the controller 22. In the present embodiment, the controller 22 outputs the input data corresponding to manipulation inputs to the entertainment apparatus 14. In addition, the controller 22 related with the present embodiment has a USB port. The controller 22 can output the input data to the entertainment apparatus 14 in a wired manner by connecting to the entertainment apparatus 14 with a USB cable. Further, the controller 22 related with the present embodiment has a wireless communication module through which the input data is outputted to the entertainment apparatus 14 in a wireless manner.

The controller 22 related with the present embodiment has a vibrator that vibrates with intensities corresponding to a signal indicative of vibration intensity received from the entertainment apparatus 14.

In the present embodiment, as described above, a video image generated by the entertainment apparatus 14 by the execution of a game program or the reproduction of content such as a movie recorded on an optical disc is displayed on the display block 36 of the HMD 12 or the display 18.

Then, in the video image display system 10 related with the present embodiment, notification is executed in accordance with duration of time in which the HMD 12 is worn on the user. The following further describes the notification that is executed in accordance with duration of time in which the HMD 12 is worn on the user.

Figure 3:
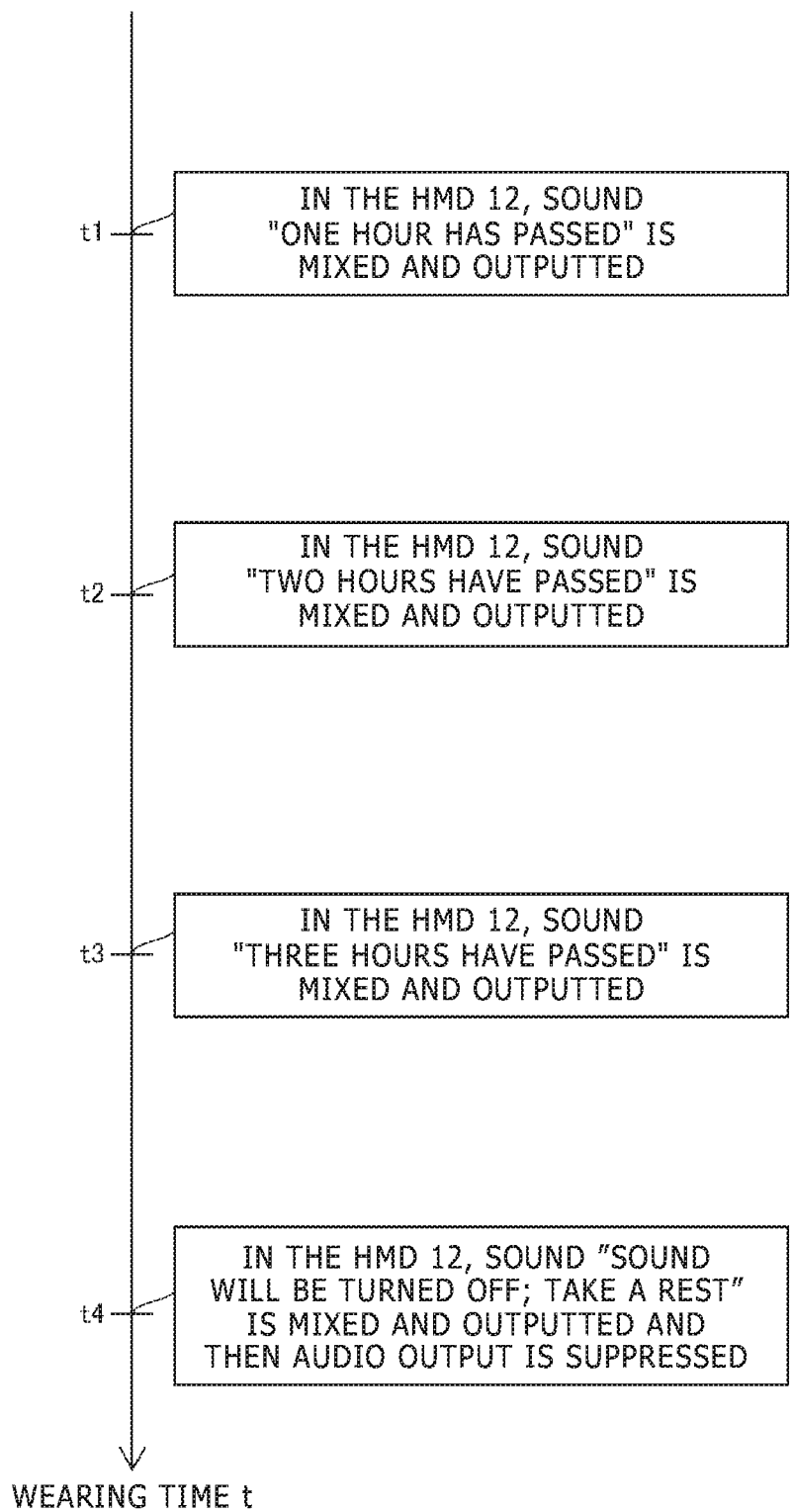
FIG. 3 is a diagram illustrating one example of a notification in accordance with a wearing time of a head-mounted display that is executed therein related with one embodiment of the present invention.

Referring to FIG. 3, there is depicted a diagram illustrating one example of a notification in accordance with wearing time t of the HMD 12 on the user who wears the HMD 12, the notification being executed in the video image display system 10 related with the present embodiment. In the example depicted in FIG. 3, the main execution entity of a notification in accordance with wearing time t of the HMD 12 is the HMD 12 and this notification is directed to the user who wears the HMD 12 as described below.

Assume, for example, that the wearing time t of the HMD 12 worn by the user has exceeded the first time t1 (one hour, for example) in total. In this case, for example, a sound "One hour has passed" is mixed with a sound represented by an audio signal received from the relay apparatus 16 and the mixed sound is outputted from the audio output block 38.

Assume again, for example, that the user still continues to wear the HMD 12 and the wearing time t of the HMD 12 has excessed the second time t2 in total (two hours, for example). Then, for example, a sound "Two hours have passed" is mixed with a sound represented by an audio signal received from the relay apparatus 16 and the mixed sound is outputted from the audio output block 38.

Assume, for example, that the user still continues to wear the HMD 12 and the wearing time t of the HMD 12 has excessed the third time t3 in total (three hours, for example). Then, for example, a sound "Three hours have passed" is mixed with a sound represented by an audio signal received from the relay apparatus 16 and the mixed sound is outputted from the audio output block 38.

Assume, for example, that the user still continues to wear the HMD 12 and the wearing time t of the HMD 12 excesses the fourth time t4 in total (four hours, for example). Then, for example, a sound "The sound will be turned off. Take a rest" is mixed with a sound represented by an audio signal received from the relay apparatus 16 and the mixed sound is outputted from the audio output block 38. Subsequently, the outputting of the sound represented by the audio signal received from the relay apparatus 16 by the HMD 12 is suppressed. As described above, in the example depicted in FIG. 3, if wearing time t of the HMD 12 of the user exceeds the fourth time t4 (four hours, for example) in total, no sound from the audio output block 38 is outputted.

Figure 4:
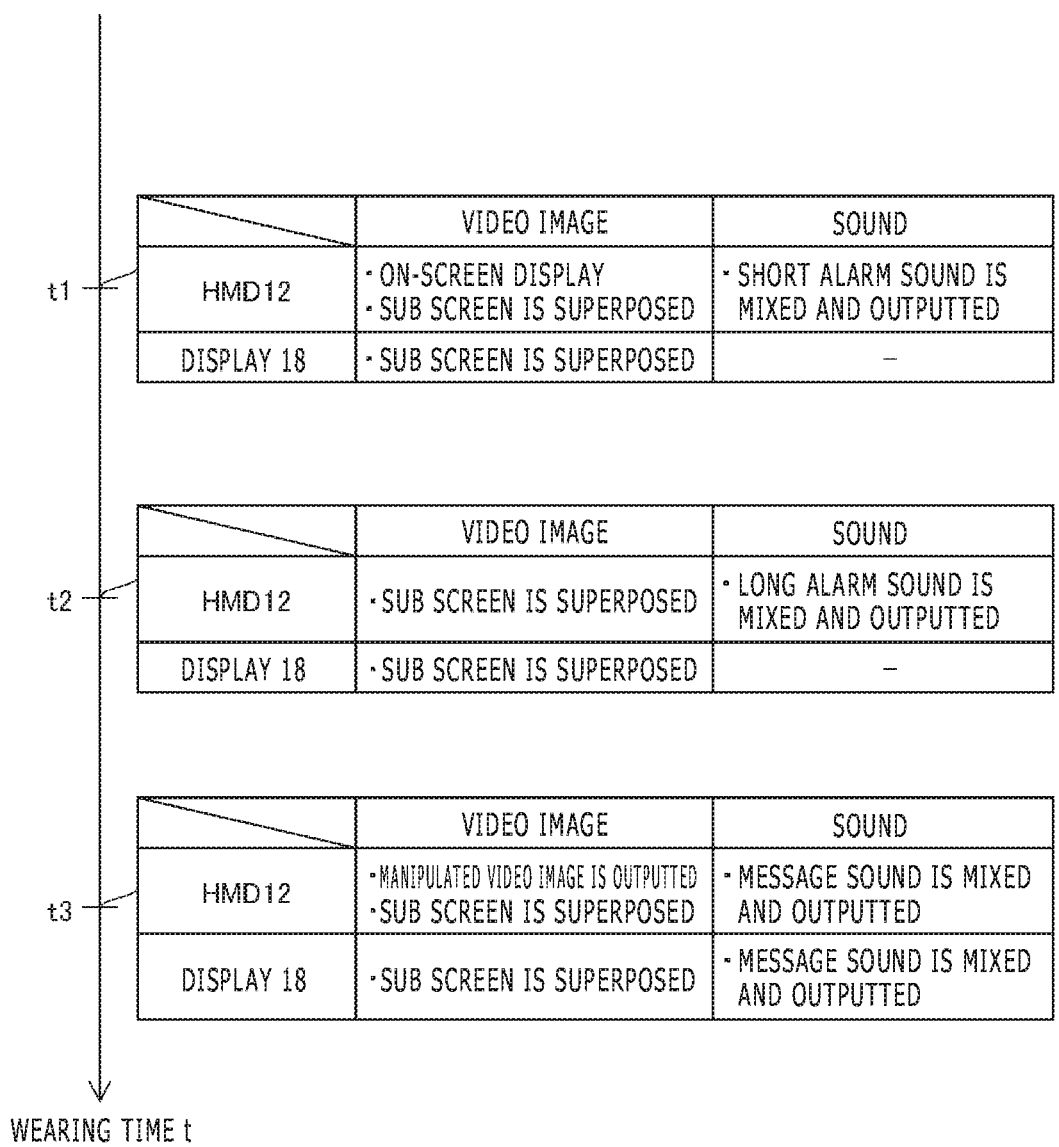
FIG. 4 is a diagram illustrating another example of a notification in accordance with a wearing time of a head-mounted display that is executed therein related with one embodiment of the present invention.

Referring to FIG. 4, there is depicted a diagram illustrating one example of a notification in accordance with wearing time t of the HMD 12 of the user who wears the HMD 12, the notification being executed in the video image display system 10 related with the present embodiment. In the example depicted in FIG. 4, the main execution entity of a notification in accordance with wearing time t of the HMD 12 is the relay apparatus 16 and this notification is directed to the user wearing the HMD 12 and a person not wearing the HMD 12 as described below.

Assume again, for example, that the wearing time t of the HMD 12 of the user has exceeded the first time t1 in total (one hour, for example). In this case, a video image signal representative of a video image obtained by superposing a video image represented by a video image signal transmitted from the entertainment apparatus 14 with a given character realized by the sub screen and the on-screen display function of the relay apparatus 16 is outputted to the HMD 12, for example. Further, a sound represented by audio data of a short alarm sound stored in the memory beforehand of the relay apparatus 16 is mixed with a sound represented by an audio signal transmitted from the entertainment apparatus 14 and the mixed sound is outputted to the HMD 12, for example. Then, the video image thus manipulated is displayed on the display block 36 and the mixed sound is outputted from the audio output block 38, for example. In this case, the relay apparatus 16 generates a video image signal representative of a video image with the video image represented by the video image signal transmitted from the entertainment apparatus 14 superposed with the sub screen and outputs the resultant video image signal to the display 18, for example. Then, the video image thus manipulated is displayed on the display 18, for example. It should be noted that, in this case, an audio signal transmitted from the entertainment apparatus 14 is directly outputted to the display 18.

Assume, for example, that the user continues to wear the HMD 12 and the wearing time t of the HMD 12 of the user has exceeded the second time t2 in total (two hours, for example). Then, the relay apparatus 16 generates a video image signal representative of a video image with a sub screen superposed with a video image represented by a video image signal transmitted from the entertainment apparatus 14 and outputs the resultant video image signal to the HMD 12 and the display 18, for example. Further, a sound represented by the audio data of a long alarm sound stored beforehand in the memory of the relay apparatus 16 is mixed with a sound represented by an audio signal transmitted from the entertainment apparatus 14 and the resultant sound is outputted to the HMD 12, for example. In addition, the video image thus manipulated is displayed on the display block 36 and the mixed sound is outputted from the audio output block 38, for example. Further, substantially the same video image signal and audio signal as those provided when time t1 is exceeded, for example, is outputted to the display 18.

Assume again, for example, that the user still continues to wear the HMD 12 and the wearing time t of the HMD 12 of the user has exceeded the third time t3 (three hours, for example) in total. Then, for example, the relay apparatus 16 tones down a video image represented by a video image signal transmitted from the entertainment apparatus 14 and generates a video image obtained by manipulating a video image represented by a video image signal transmitted from the entertainment apparatus 14, such as a video image superposed with the sub screen. Next, the relay apparatus 16 outputs a video image signal representing this video image to the HMD 12. Further, a sound representative of the audio data of a message stored beforehand in the relay apparatus 16, for example, is mixed with a sound represented by an audio signal transmitted from the entertainment apparatus 14 and the resultant sound is outputted, for example. Then, the video image thus manipulated is displayed on the display block 36 and the mixed sound is outputted from the audio output block 38, for example. In addition, in this case, the relay apparatus 16 generates a video image signal representative of a video image with a sub screen superposed with a video image represented by a video image signal transmitted from the entertainment apparatus 14 and outputs the resultant video image signal to the display 18, for example. Therefore, substantially the same video image signal as that provided when time t1 is exceeded is outputted to the display 18, for example. In addition, a sound represented by the audio data of the above-mentioned message, for example, is mixed with a sound represented by an audio signal transmitted from the entertainment apparatus 14 and the resultant sound is outputted to the display 18. It should be noted that the above-mentioned content described with reference to FIG. 4 is nothing but an example; namely, if wearing time t of the HMD 12 of the user has exceeded time t1, time t2, or time t3 in total, video images and sounds other than those described above may be outputted to the HMD 12 and the display 18. Further, in this case, different video images and different sounds may be outputted to the HMD 12 and the display 18. It is also practicable to execute, by the display block 36 of the HMD 12 or the display 18, the processing of displaying given characters and symbols on the screen, the processing of adding a sub screen to the displayed main screen, and the processing of making a video image thinner or monochromatic.

Referring to FIG. 5, there is depicted a diagram illustrating another example of the notification in accordance with wearing time t of the HMD 12 of the user who wears the 12, the notification being executed in the video image display system 10 related to the present embodiment. In the example depicted in FIG. 5, the main entity of a notification in accordance with wearing time t of the HMD 12 is the entertainment apparatus 14 and this notification is directed to the user wearing the HMD 12 and a person not wearing the HMD 12, as described below. It should be noted that, in the example depicted in FIG. 5, it is assumed that a game program be being executed on the entertainment apparatus 14.

Here, assume, for example, that the wearing time t of the HMD 12 of the user has exceeded the first time t1 in total (one hour, for example). In this case, a dedicated character appears in a video image displayed on the HMD 12 or the display 18 to tell the user of the passing of time t, for example. Then, suppose that the wearing time of the HMD 12 of the user have exceeded the second time t2 (two hours, for example) in total. Then, the above-mentioned dedicated character appears again in the video image displayed on the HMD 12 or the display 18 to tell the user of the passing of time t2 and, at the same time, the entertainment apparatus 14 outputs a signal indicative of predetermined vibration intensity to the controller 22. Then, the controller 22 vibrates with an intensity corresponding to this signal.

It should be noted that, instead that a dedicated character appears, the passing of time t1 or time t2 may be displayed at such a position that does not affect the progression of a game as a background, a billboard, or a wall, for example.

In addition, if the game being played is a game of battle type or a game of match-up type, for example, then a state may be provided in which no attack comes while the above-mentioned dedicated character appears or the passing of predetermined time is displayed.

Further, while the above-mentioned dedicated character appears or it is displayed that a predetermined time has been exceeded, the entertainment apparatus 14 may prevent the physical power of the character subject to the manipulation by the user from getting higher or make it difficult for the character to increase the physical power thereof, for example. In addition, while the above-mentioned dedicated character appears or it is displayed that a predetermined time has been exceeded, the motion of the character subject to the manipulation by the user may be slow down or the character subject to the manipulation by the user may be made unmovable, for example.

Still further, if the game being played is a racing game, for example, and wearing time t of the HMD 12 of the user exceeds a predetermined time in total, a safety car may appear to make the notification thereof.

It should be noted that the content described with reference to FIG. 5 can be realized by providing a library for implementing the above-mentioned functions to a provider of a game program and make the provider implement the game program that uses this library, for example.

While a user is enjoying an item of content that is high in the sense of immersion, such as in the middle of playing games, the user feels uncomfortable if the reproduction of that content is discontinued, in general. Therefore, if a notification corresponding to wearing time t of the HMD 12 as described in FIG. 5 is executed, the user is able to receive the notification in a form unitized with the world view of the content.

The notifications as depicted in FIG. 3 and FIG. 4 can be implemented independently of the program being executed or the content being reproduced unlike the notification depicted in FIG. 5.

The notification depicted in FIG. 3, it is possible to be implemented according to wearing time t of the HMD 12 more simply than the notifications depicted in FIG. 4 and FIG. 5.

In the above, with reference to FIG. 3 through FIG. 5, the main execution entity of the processing of notification according to wearing time t of the HMD 12 and a person of the destination of notification are the same regardless of the length of wearing time t has been described. However, it is also practicable that the main execution entity of the processing of notification according to wearing time t of the HMD 12 and a person of the destination of notification may be variable according to the length of wearing time t.

The following describes the case in which the main execution entity of the processing of notification according to wearing time t of the HMD 12 and a person of the destination of notification may be variable according to the length of wearing time t, with reference to FIG. 6.

As depicted in FIG. 6, assume, for example, that the wearing time t of the HMD 12 of the user has exceeded the first time t1 (one hour, for example). In this case, as described with reference to FIG. 3, a sound, for example, "One hour has passed" is mixed with a sound represented by an audio signal received from the relay apparatus 16 and the resultant sound is outputted from the audio output block 38 of the HMD 12. As described with reference to FIG. 3, the main execution entity of this processing is the HMD 12. Also, in this case, the user wearing the HMD 12 is notified of the passing of the wearing time t of the HMD 12 beyond time t1 in total; however, this notification is not given to a person not wearing the HMD 12.

Assume, for example, that the user still continued to wear the HMD 12 and therefore the wearing time t of the HMD 12 of the user has exceeded the second time t2 in total (two hours, for example). In this case, a video image signal with a sub screen superposed with a video image represented by a video image signal transmitted from the entertainment apparatus 14 is outputted to the HMD 12. Also, a sound represented by audio data of a long alarm sound stored beforehand in the relay apparatus 16 is mixed with a sound represented by an audio signal transmitted from the entertainment apparatus 14 and the resultant sound is outputted to the HMD 12, for example. Then, the video image obtained by such manipulation is displayed on the display block 36, for example, and the mixed sound is outputted from the audio output block 38. In this case, on the display 18, the display indicative that the wearing time t has expired is started on the sub screen. The main processing entity of this processing is relay apparatus 16. In this case, a notification that the wearing time t of the HMD 12 of the user has exceeded time t2 in total is given to the user wearing the HMD 12 and a person not wearing the HMD 12, a viewer of the display 18, for example, in different forms.

Assume, for example, that the user still continues to wear the HMD 12 and the wearing time t of the HMD 12 of the user has exceeded the third time t3 in total (three hours, for example). In this case, the motion of the character subject to the manipulation by the user slows down, for example. The main processing entity of this processing is the entertainment apparatus 14. It should be noted that, at this moment, the character subject to the manipulation by the user may not be movable. Note that in this case, the display 18 continues to display the sub screen indicative that the wearing time t of the HMD 12 of the user has expired. In this case, a notification that the wearing time t of the HMD 12 of the user has exceeded time t3 in total is given to both the user wearing the HMD 12 and a person who does not wear the HMD 12, a person viewing the display 18, for example.

Assume, for example, that the user still continues to wear and the wearing time t of the HMD 12 of the user has exceeded the fourth time t4 in total (four hours, for example). In this case, the video image and the sound outputted on the HMD 12 are forcibly muted, for example. Then, the display 18 additionally displays that the video image and the sound are forcibly muted. The main execution entity of this processing is the relay apparatus 16. In this case, a notification that the wearing time t of the HMD 12 of the user has exceeded time t4 in total is given to both the user wearing the HMD 12 and a person who does not wear the HMD 12, a person viewing the display 18, for example. It should be noted that this processing may be executed by the entertainment apparatus 14 or the HMD 12.

As described above with reference to FIG. 3 through FIG. 6, the notification according to the wearing time t of the HMD 12 of the user wearing the HMD 12 is executed two or more times in the video image display system 10 related with the present embodiment. In addition, as the wearing time t of the HMD 12 gets longer, the intensity degree of the notification gets stronger in stepwise manner.

In the example depicted in FIG. 6, for example, the notification of the passing of the wearing time t over time t1 is executed simply by the HMD 12. Then, the subsequent notification of the passing of the wearing time t over time t2 is mainly executed by the relay apparatus 16. Then, the further subsequent notification of the passing of the wearing time t over time t3 is mainly executed by the entertainment apparatus 14. Further, in the present embodiment, the notification of the passing of the wearing time t over time t3 is implemented by an application.

Further, in the example depicted in FIG. 6, if the wearing time t has exceeded times t1, t2, and t3 before the muting of a video image and a sound to be executed if the wearing time t has exceeded time t4, the notifications thereof are given to the user wearing the HMD 12 every time each of the times t has been exceeded. Therefore, the user wearing the HMD 12 can easily determine whether or not the muting is done because of a failure or because the wearing time t is too long.

In addition, in the example depicted in FIG. 6, the notification of the passing of the wearing time t over time t1 is given to the user wearing the HMD 12. Then, the notification of the passing of the wearing time t over time t2 that is executed after the notification of the passing of time t1 is given to a person who does not wear the HMD 12, a person viewing the display 18, for example.

As described above, in the example depicted in FIG. 6, when the wearing time t of the user wearing the HMD 12 has exceeded time t1, a notification thereof is given to this user, so that this user can know that he or she has been wearing the HMD 12 for a long time. However, it may be possible that the user concerned continues to wear the HMD 12 if the user is immersed in a game play, for example. In such a case, in the present embodiment, when the wearing time t of the user wearing the HMD 12 has exceeded time t2 that is longer than time t1, a notification thereof is given to a person who does not wear the HMD 12, a person viewing the display 18, for example. Thus, according to the present embodiment, a person who does not wear the HMD 12, a person viewing the display 18, for example, is able to know that the user still continues to wear the HMD 12 after the notification of the passing of the wearing time t over a predetermined time. Therefore, a person who views the display 18, for example, can be prompted to instruct the user concerned to detach the HMD 12. Here, a person who does not wear the HMD 12 may be a user play a game with the user concerned, a person viewing a movie, for example, with the user concerned, or a parental guardian of the user concerned, the parental guardian being located at a position where the display 18 can be seen, for example.

In what follows, a notification such as the notification of the passing of time t1 in the example depicted in FIG. 6 is referred to as a first notification to the user who wears the HMD 12. Further, a notification such as the notification of the passing of time t2 in the example depicted in FIG. 6 is referred to as a second notification to the user who does not wear the HMD 12.

Incidentally, as with the example depicted in FIG. 6, the second notification may be given to the user wearing the HMD 12 and a person not wearing the HMD 12. In addition, the second notification may not be given to the user wearing the HMD 12.

Note that, if the video image display system 10 has two or more HMDs 12 and the wearing time t of the user wearing the HMD 12 has exceeded time t2, the second notification may be given to the user wearing another HMD 12, not the HMD 12 concerned.

It should be noted that, in the example depicted in FIG. 6, the second notification is given through the display 18; however, the second notification is not limited to this notification. For example, if the wearing time t of the user wearing the HMD 12 has exceeded time t2, an electronic mail message may be sent to the parental guardian, for example, of the user concerned. In this case, the notification based on an electronic mail message is the second notification.

Incidentally, in the example depicted in FIG. 6, if the wearing time t of the HMD 12 of the user has exceeded the first time t1 in total (one hour, for example), the display 18 may start the display indicative of the expiration of the wearing time t in the sub screen.

The following further describes the functions of the HMD 12 related with the present embodiment and the processing that is executed in the HMD 12 related with the present embodiment by focusing the notifications that are given if the wearing time t of the user wearing the HMD 12 has exceeded predetermined times.

Figure 7:
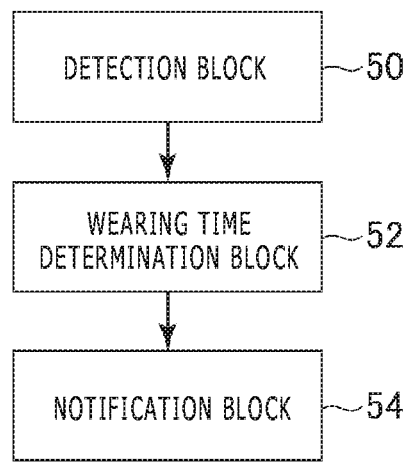
FIG. 7 is a functional block diagram illustrating one example of functions mounted in the head-mounted display related with one embodiment of the present invention.

Referring to FIG. 7, there is depicted a block diagram illustrating one example of functions that are implemented in the HMD 12 related with the present embodiment. It should be noted that all the functions depicted in FIG. 7 need not be implemented in the HMD 12 related with the present embodiment or functions other than those depicted in FIG. 7 may be implemented.

As depicted in FIG. 7, the HMD 12 related with the present embodiment functionally includes, for example, a detection block 50, a wearing time determination block 52, and a notification block 54. The detection block 50 is implemented mainly as the sensor block 40. The wearing time determination block 52 is implemented mainly as the control block 30. The notification block 54 is implemented mainly as the control block 30, the input/output block 34, and the audio output block 38.

The functions mentioned above are installed by executing by the control block 30 a program that includes instructions corresponding to these functions, this program being implemented in the HMD 12 that is a computer. This program is supplied to the HMD 12 through a computer-readable information storage medium such as an optical disc, a magnetic disc, a magnetic tape, a magneto-optical disc, or a flash memory or through the Internet, for example.

The detection block 50 detects the attachment or detachment of the HMD 12 by the user who wears the HMD 12.

The wearing time determination block 52 determines the wearing time t of the HMD 12 of the user who wears the HMD 12. In the present embodiment, for example, the wearing time determination block 52 determines the wearing time t on the basis of the attachment or detachment of the HMD 12 detected by the detection block 50. For example, on the basis of results of the detection by the detection block 50, in an interval in which the user is found wearing the HMD 12, wearing time t may be added; in an interval in which the user is found not wearing the HMD 12, wearing time t may not be added. Also, it is practicable to reset wearing time t if an interval in which the user is found not continuously wearing the HMD 12 is found having exceeded a predetermined time. Further, it is practicable to subtract wearing time t in an interval in which the user is found not wearing the HMD 12. Also, wearing time t need not be determined on the basis of the attachment or detachment of the HMD 12 detected by the detection block 50; for example, wearing time t may be added in an interval in which the power to the HMD 12 is on. As described above, in the present embodiment, the determination method of determining the wearing time t of the HMD 12 by the wearing time determination block 52 is not especially limited.

In the present embodiment, for example, the notification block 54 gives a notification in accordance with the wearing time t of the HMD 12 of the user wearing the HMD 12. In the present embodiment, the notification block 54 executes a notification in accordance with wearing time t determined by the wearing time determination block 52. In addition, in the present embodiment, if the wearing time t of the HMD 12 of the user exceeds the first time (time t1 in the example depicted in FIG. 6), the notification block 54 executes the first notification to the user concerned. Further, in the present embodiment, when the wearing time t of the HMD 12 of the user has exceeded the second time (time t2 in the example depicted in FIG. 6) that is longer than the first time, the notification block 54 executes the second notification to a person not wearing the HMD 12.

In the present embodiment, the notification block 54 executes notifications in various forms as described above. For example, as described with reference to time t1 depicted in FIG. 3 and FIG. 6, a notification is sometimes executed with the HMD 12 solely. In this case, the notification block 54 outputs a predetermined sound described above, for example. As described with reference to time t2, time t3, and time t4 depicted in FIG. 4, FIG. 5, and FIG. 6, the entertainment apparatus 14 or the relay apparatus 16 may be the main execution entity of each notification, for example. In this case, the notification block 54 outputs a notification to the entertainment apparatus 14 or the relay apparatus 16 that the wearing time t of the HMD 12 has exceeded one of the above-mentioned times t1 through t4, for example. When the wearing time t has exceeded time t1, the notification block 54 executes the above-mentioned first notification indicative that the wearing time t has exceeded the time t1; when the wearing time t has exceeded time t2, the notification block 54 executes the above-mentioned second notification indicative that the wearing time t has exceeded time t2i, for example. Also, as described above, while the user wears the HMD 12, the notification block 54 executes the second notification through the display 18 that is visually imperceptible to the user concerned.

The entertainment apparatus 14 or the relay apparatus 16 that received this notification identifies the processing of the notification described with reference to FIG. 4 through FIG. 6 on the basis the received notification and executes the identified processing. In this case, the entertainment apparatus 14 or the relay apparatus 16 that received the first notification from the HMD 12 executes the first notification to the user wearing the HMD 12. Further, the entertainment apparatus 14 or the relay apparatus 16 that received the second notification from the HMD 12 executes the second notification to a person not wearing the HMD 12.

Figure 8:
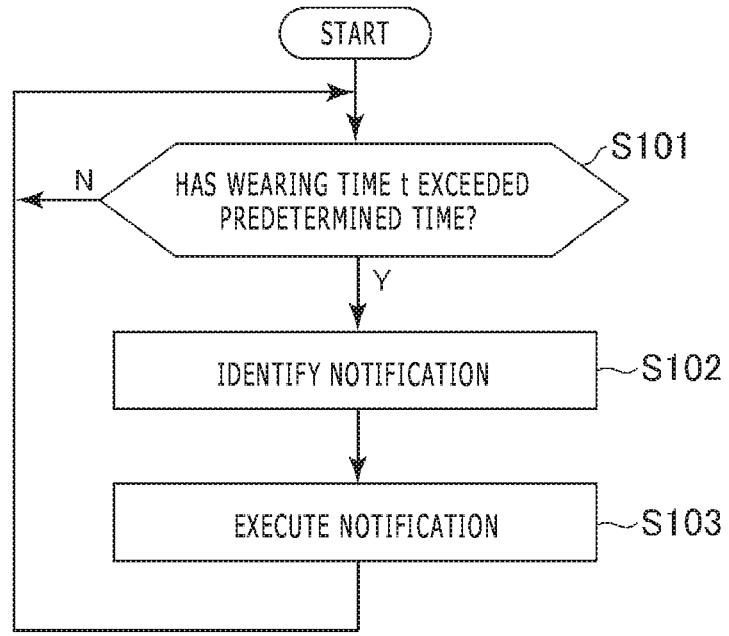
FIG. 8 is a flowchart indicative of one example of a flow of processing that is executed in the head-mounted display related with one embodiment of the present invention.

The following describes an example of a flow of the processing that is executed in the HMD 12 relative with the present embodiment with reference to a flowchart depicted in FIG. 8.

First, the wearing time determination block 52 monitors wearing time t (S101). In the processing depicted in S101, it is determined whether or not wearing time t has reached any of the predetermined times set in stepwise manner (for example, the above-mentioned time t1, time t2, time t3, and time t4), for example.

Next, if a predetermined time is found reached (S101: Y), then the notification block 54 identifies a notification to be executed on the basis of the predetermined time that is reached (S102). Next, the notification block 54 executes the notification identified by the processing depicted in S102 (S103). In the processing depicted in S103, it is executed that output a predetermined sound as described above and output a signal indicative that the wearing time t of the HMD 12 has exceeded a predetermined time to the entertainment apparatus 14 or the relay apparatus 16, for example. Next, the processing returns to S101. In the processing depicted in S103, the first notification to the user wearing the HMD 12 or the second notification to the user not wearing the HMD 12 is executed in accordance with the notification identified by the processing depicted in S102.

It should be noted that the present invention is not limited to the present embodiment.

For example, the sensor block 40 may have a camera that is capable of identifying each user wearing the HMD 12 on the basis a known iris scanning technology or the like, for example. The wearing time determination block 52 may also have a function of identifying a user wearing the HMD 12.

Further, the wearing time determination block 52 may manage wearing time t for each user. If the wearing time determination block 52 determines that the wearing time t for the user identified by the sensor block 40 has exceeded a predetermined time, then the notification block 54 may execute the first notification and the second notification in accordance with the wearing time t concerned described above.

In addition, the video image display system 10 may include two or more HMDs 12, for example. The wearing time t of the HMD 12 may also be identified in each of the two or more HMDs 12. Further, if the wearing time determination block 52 determines that wearing time t has exceeded a predetermined time in a certain HMD 12, the notification block 54 of this HMD 12 may execute the above-mentioned first notification and second notification in accordance with the wearing time t concerned. Here, for example, the notification block 54 of the HMD 12 may execute the second notification to a user wearing another HMD 12.

Further, for example, the users wearing two or more HMD 12 may be identified and wearing time t may be managed for each of the users. In addition, if the wearing time determination block 52 determines that wearing time t for the identified user has exceeded a predetermined time in certain HMD 12, then the notification block 54 of this HMD 12 may execute the above-mentioned first notification and second notification in accordance with the wearing time t concerned.

In the case where wearing time t is managed for each of the users, when the wearing time t of the HMD 12 of the identified user has exceeded a predetermined time (time t2, for example), the notification block 54 may execute the second notification that can identify the user for whom wearing time t is determined exceeding a predetermined time. To be more specific, the second notification including such identification information of a user as the identification (ID) and name of this user for whom wearing time t is determined exceeding a predetermined time may be transmitted to the display 18, for example. The identification information of the user concerned may also be displayed on the display 18. This configuration allows the person viewing the display 18 to recognize which user's wearing time t of the HMD 12 is long.

Further, in this case, in the first notification to the user wearing the HMD 12 to be executed before the above-mentioned second notification, it is enough to tell to the user wearing the HMD 12 that the wearing time t is long. Hence, when the wearing time t of the HMD 12 of the identified user has exceeded a predetermined time (time t1, for example), the notification block 54 may execute a common notification regardless of a user wearing the HMD 12. To be more specific, a sound represented by the audio data of a predetermined message may be outputted from the audio output block 38.

It should be noted that the role division among the HMD 12, the entertainment apparatus 14, and the relay apparatus 16 is not limited to that described above. For example, a part or all of the functions illustrated in FIG. 7 may be implemented in the entertainment apparatus 14 or the relay apparatus 16. Alternatively, the functions illustrated in FIG. 7 may be implemented, in a dispersed manner, in the HMD 12, the entertainment apparatus 14, and relay apparatus 16 that constitute the video image display system 10.

To be more specific, when the attachment or detachment of the HMD 12 is detected by the sensor block 40, the HMD 12 may output a signal indicative of a detection result to the entertainment apparatus 14 or the relay apparatus 16, for example. Then, the wearing time t of the HMD 12 of the user may be determined on the basis of the signal received by the entertainment apparatus 14 or the relay apparatus 16. Thus, the entertainment apparatus 14 or the relay apparatus 16 may have the function of the wearing time determination block 52. In addition, the entertainment apparatus 14 or the relay apparatus 16 may execute notifications in accordance with the wearing time t determined in the entertainment apparatus 14 or the relay apparatus 16. Thus, the entertainment apparatus 14 or the relay apparatus 16 may have the function of the notification block 54 described above.

In addition, the detection block 50 of the HMD 12 may detect the attachment or detachment of the HMD 12 by the user wearing the HMD 12 on the basis of an image taken with the camera 20a, for example. In this case, the function of the detection block 50 may be provided not by the HMD 12 but by the entertainment apparatus 14 or the relay apparatus 16.

It should be noted that the above-mentioned specific character strings and numerals and the specific character strings and numerals in the drawings are illustrative only and therefore not limited thereto.

The invention claimed is:

1. A head-mounted display comprising:
a microprocessor and a non-transitory, computer readable storage medium containing a computer program, which when executed by the microprocessor implements the following circuits:
a wearing time determination block configured to determine a wearing time of a user wearing the head-mounted display; and
a notification block configured to execute a first notification to the user if the wearing time has exceeded a first time and, when the wearing time has exceeded a second time longer than the first time, execute a second notification to a person not wearing the head-mounted display.

2. The head-mounted display according to claim 1, wherein if the wearing time has exceeded the second time, the notification block executes the second notification through a display that is visually imperceptible to the user while the user wears the head-mounted display.

3. The head-mounted display according to claim 1, further comprising:
a user identification block configured to identify a user wearing the head-mounted display wherein,
the wearing time determination block identifies a wearing time of the head-mounted display of the identified user, and
if the wearing time of the identified user has exceeded the second time, the notification block executes the second notification enabled to identify the user concerned.

4. The head-mounted display according to claim 3, wherein if the wearing time of the identified user has exceeded the first time, the notification block executes the first notification that is common regardless of a user wearing the head-mounted display.

5. A notification apparatus comprising:
a microprocessor and a non-transitory, computer readable storage medium containing a computer program, which when executed by the microprocessor implements the following circuits:
a wearing time determination block configured to determine a wearing time of a user wearing the head-mounted display; and
a notification block configured to execute a first notification to the user if the wearing time has exceeded a first time and, when the wearing time has exceeded a second time longer than the first time, execute a second notification to a person not wearing the head-mounted display.

6. A notification method comprising:
controlling a microprocessor, via execution of a computer program, which when executed by the microprocessor implements the following actions:
determining a wearing time of a user wearing a head-mounted display; and
executing a first notification to the user if the wearing time has exceeded a first time and, when the wearing time has exceeded a second time longer than the first time, and executing a second notification to a person not wearing the head-mounted display.

* * * * *